United States Patent [19]
Shiraishi et al.

[11] Patent Number: 5,275,254
[45] Date of Patent: Jan. 4, 1994

[54] CONTROL SYSTEM FOR FOUR-WHEEL DRIVE VEHICLE

[75] Inventors: Masaru Shiraishi, Hatsukaichi; Hideshi Hiruta, Hiroshima; Nobuyuki Nakamura, Hiroshima; Yoshitaka Kimura, Hiroshima; Minoru Takata, Hiroshima; Naotsugu Masuda, Hiroshima, all of Japan

[73] Assignee: Mazda Motor Corporation, Hiroshima, Japan

[21] Appl. No.: 903,156

[22] Filed: Jun. 24, 1992

[30] Foreign Application Priority Data

Jun. 27, 1991 [JP] Japan .................. 3-156958

[51] Int. Cl.⁵ .............................. B60K 17/34
[52] U.S. Cl. .................... 180/248; 180/249; 364/424.1
[58] Field of Search .............. 180/248, 233, 249, 250; 364/424.1

[56] References Cited

U.S. PATENT DOCUMENTS

| 4,874,059 | 10/1989 | Kasegawa | 180/249 |
| 4,937,750 | 6/1990 | Gilliam | 180/248 X |
| 5,010,974 | 4/1991 | Matsuda | 180/248 X |
| 5,119,900 | 6/1992 | Watanabe et al. | 180/249 X |
| 5,152,362 | 10/1992 | Naito | 180/248 |

FOREIGN PATENT DOCUMENTS

| 0279136 | 12/1987 | Japan | 180/249 |
| 0018122 | 1/1990 | Japan | 180/249 |

Primary Examiner—Margaret A. Focarino
Assistant Examiner—C. Mattix
Attorney, Agent, or Firm—Keck, Mahin & Cate

[57] ABSTRACT

A control system for a four-wheel drive vehicle includes a first differential provided between a front shaft and a rear shaft and a second differential provided between a right wheel and a left wheel. The control system comprises a first device provided in the first differential for restricting a differential between the front shaft and the rear shaft, a second device provided in the second differential for restricting a differential between the right wheel and the left wheel, and a device for controlling the restricting operations carried out by the first device and the second device. The controlling device includes a device for controlling operational timings in the first device and the second device so that the timing when the first device maintains the first differential in locking condition is different from the timing when the second device maintains the second differential in locking condition.

14 Claims, 12 Drawing Sheets

MAP 1

MAP 2

CONTROL SYSTEM FOR FOUR-WHEEL DRIVE VEHICLE

BACKGROUND OF THE INVENTION

1. Field of the Invention

The present invention relates to a control system for a four-wheel drive vehicle and, in particular, to a control system for a four-wheel drive vehicle having differential restricting devices.

2. Description of the Related Art

A four-wheel drive vehicle is, in general, provided with a center differential, mounted between a front propeller shaft and a rear propeller shaft, for compensating the differential, between front wheels and rear wheels, and a rear differential mounted between right and left rear wheels.

For example, Japanese Patent Laid-Open No. 62-166,114 discloses a four-wheel drive vehicle which comprises a front differential, a center differential and a rear differential, each of the differentials including a differential restricting device such as a clutch. The differential restricting device can be operated so as to be in a locking condition or an unlocking condition based on the various traveling conditions of the vehicle such as traveling on a rough road, traveling in a straight line, accelerating condition and traveling in a braking condition, which conditions are determined based on data representing wheel rotating speed and steering angle. The stability, braking performance, acceleration performance and the like of the vehicle can be improved by such operations of the differential restricting device.

Japanese Patent Laid-Open No. 62-166,113 discloses a four-wheel drive vehicle with a center differential restricting device. The center differential restricting device controls a torque to be transmitted based on a differential rotating number between front wheels and rear wheels. The torque is controlled so as to decrease when the differential rotating number between the front wheels and the rear wheels is relatively small. As a result, a good differential operation and a good differential restricting operation of the vehicle can be obtained.

Japanese Patent Laid-Open No. 63-251,327 discloses a four-wheel drive vehicle with a center differential restricting device which is automatically locked when the vehicle is starting. As a result, when the vehicle is starting, a driver does not need to operate manually a center differential so as to be locked, and a differential locking operation can be carried out with certainty.

In the above mentioned conventional four-wheel drive vehicle, the Plural differentials may be locked at the same time by the differential restricting devices. If the plural differentials are locked at the same time, the driving torque changes rapidly and so called torque shock occurs. Moreover, since all differentials are operated to be in locking condition and in unlocking condition under substantially the same conditions at almost same time by the differential restricting devices, hunting phenomena might occur simultaneously in all of the differential restricting devices under a certain driving condition. Furthermore, the respective differential restricting devices are provided with electro-magnetic or fuel-operated multiplate clutches. Where the differential restricting devices are provided with the electro-magnetic multiplate clutches, large electric load is generated in a control system since all electro-magnetic multi-plate clutches are operated simultaneously.

SUMMARY OF THE INVENTION

It is therefore an object of the present invention to provide a control system for a four-wheel drive vehicle which can decrease the torque shock which occurs in the locking operation of the differential restricting device.

It is another object of the present invention to provide a control system for a four-wheel drive vehicle which can obtain the desired differential restricting operation and decrease the differential operation in the differential restricting device.

It is a further object of the present invention to provide a control system for a four-wheel drive vehicle comprising differential restricting devices activated electrically which can prevent the rapid fluctuation of electric load occurring in the devices.

It is another object of the present invention to provide a control system for a four-wheel drive vehicle which can prevent advantageously slips of the wheels from occurring in the starting operation.

According to the present invention, there is provided a control system for a four-wheel drive vehicle including a first differential provided between a front shaft and a rear shaft and a second differential provided between a right wheel and a left wheel. The control system comprises, first means provided in the first differential for restricting a differential between the front shaft and the rear shaft, second means provided in the second differential for restricting a differential between the right wheel and the left wheel, and means for controlling the restricting operations carried out by the first means and the second means. The controlling means includes means for controlling operational timings in the first means and the second means so that the timing, when the first means maintains the first differential in locking condition, is different from the timing when the second means maintains the second differential in locking condition.

In a preferred embodiment, the operational timing controlling means controls operational timings in the first means and the second means so that the timing when the first means releases the first differential from locking condition is different from the timing when the second means releases the second differential from locking condition.

In another preferred embodiment, the operational timing controlling means controls operational timings in the first means and the second means so that the timing when the first means operates the first differential to be in locking condition is different from the timing when the second means operates the second differential to be in locking condition.

In a further preferred embodiment, the operational timing controlling means controls operational timings in the first means and the second means so that, when one of the first and second means releases one of the first and second differentials after the first and second means maintain the first and second differentials in locking condition, the other of the first and second means releases the other of the first and second differentials after one of the first and second means has released the one of the first and second differentials for a predetermined time.

In yet another preferred embodiment, the operational timing controlling means controls operational timings in the first means and the second means so that the first differential is operated to be in locking condition in an early stage in comparison with the second differential while the vehicle is traveling at a speed which is less than a predetermined value, and the second differential is operated to be in locking condition in an early stage in comparison with the first differential while the vehicle is traveling at a speed which is equal to or greater than the predetermined value.

The above and other objects and features of the present invention will be apparent from the following description by taking reference with accompanying drawings employed to show preferred embodiments of the present invention.

DESCRIPTION OF THE PREFERRED EMBODIMENTS

Figure 1:
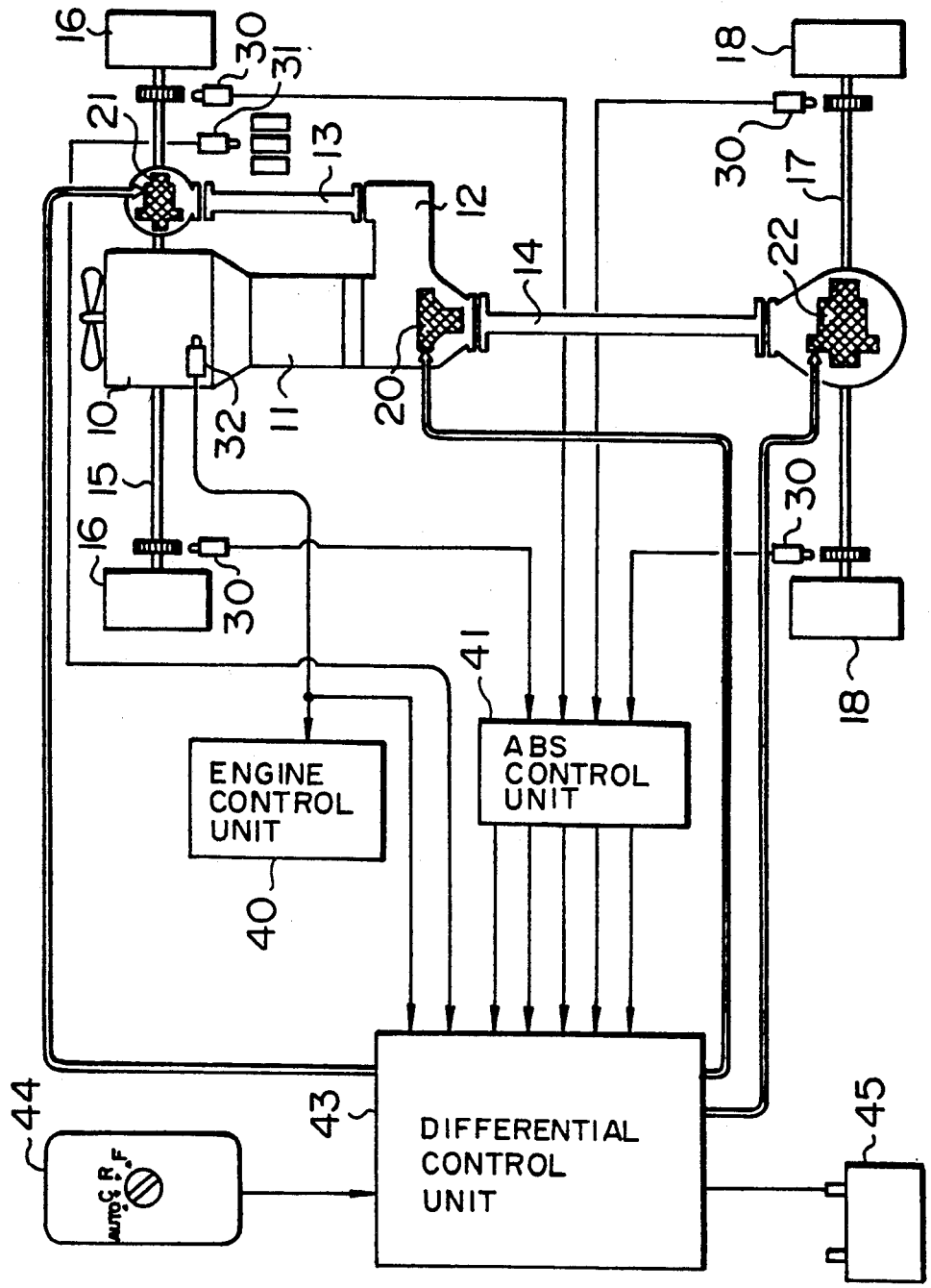
FIG. 1 is an overall schematic view of a four-wheel drive vehicle to which the present invention is applicable.

FIG. 1 is an overall schematic view of a four-wheel drive vehicle to which the present invention is applicable.

Referring to FIG. 1, a power train of the vehicle will be explained first. Reference numeral 10 indicates an engine to which a transmission 11 is connected. To the transmission 11 is connected a transfer 12 to which a front propeller shaft 13 transmitting the engine power to front wheels and a rear propeller shaft 14 transmitting the engine power to rear wheels are connected respectively. The front wheels 16 are connected to the front propeller shaft 13 through a front axle 15, and the rear wheels 18 are connected to the rear propeller shaft 14 through a rear axle 17. The transfer 12 is provided with a center differential 20, the front axle 15 is provided with a front differential 21, and the rear axle 17 is provided with a rear differential 22.

Wheel speed sensors 30 are attached respectively to the front wheels 16 and the rear wheels 18 in order to detect the respective wheel speeds of the wheels 16, 18. Reference numeral 31 indicates a brake switch for detecting on-off operation of a brake. Reference numeral 32 indicates a throttle sensor for detecting throttle valve opening of the engine 10.

Reference numeral 40 indicates an engine control unit to which the throttle valve opening detected by the throttle sensor 32 is input. Reference numeral 41 indicates a control unit for an antiskid braking system (hereinafer called ABS control unit) to which the respective wheel speeds detected by the wheel speed sensors 30 are input. Reference numeral 43 indicates a differential control unit to which a manual switch 44 described hereinbelow in detail and a battery 45 are connected respectively. To the differential control unit 43 are input the throttle valve opening detected by the throttle sensor 32, a brake signal representative of the on-off operation of the brake detected by the brake switch 31, the respective wheel speeds detected by the wheel speed sensors 30, and a mode signal output from the manual switch 44. Based on this input information, the differential control unit 43 applies electric current to the center differential 20, the front differential 21, and the rear differential 22 respectively so as to operate the differentials 20, 21, 22 in unlocking condition, half-locking condition, and complete locking condition based on the amount of the supplied electric current.

Figure 2:
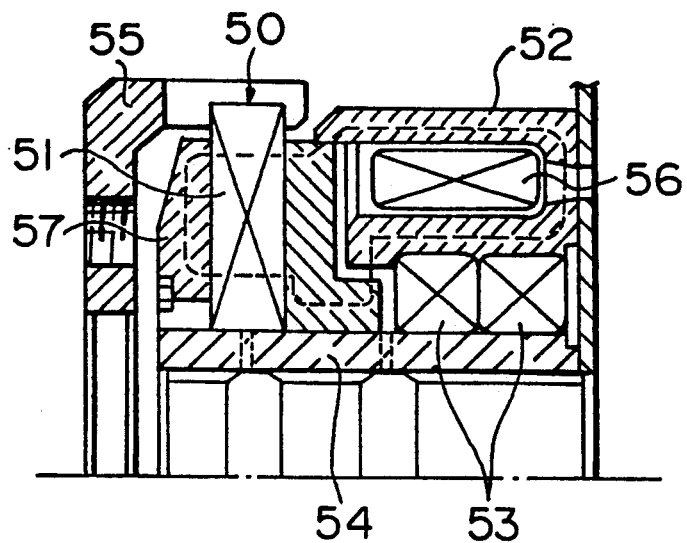
FIG. 2 is a cross-sectional view of an electro-magnetic multiplate clutch provided in a center differential.

FIG. 2 is a cross-sectional view of an electro-magnetic multiplate clutch provided in the center differential. The center differential 20 is provided with an electro-magnetic multiplate clutch 50 by which the center differential 20 is operated in unlocking condition, half-locking condition, and complete locking condition. Instead of the electro-magnetic multiplate clutch 50 shown in FIG. 2, the invention may employ any type of clutch which can restrict a differential between the front propeller shaft 13 and the rear Propeller shaft 14.

In FIG. 2, the electro-magnetic multiplate clutch 50 is provided with a clutch plate 51 including a plurality of inner disks and outer disks, and an actuator 52 for operating the clutch plate 51.

The electro magnetic multiplate clutch 50 is further provided with a bearing 53, a member 54 transmitting the power to one propeller shaft, and a member 55 transmitting the power to the other propeller shaft. The actuator 52 includes a solenoid 56 and an armature 57 which pushes out the clutch plate 51 by the magnetic force generated when the electric current is supplied to the solenoid 56. Since the amount of the electric current supplied to the solenoid 56 is proportional to the torque generated in the electro-magnetic multiplate clutch 50, namely the pushing force on the clutch plate 51, a differential rotation number of the center differential 20 can be controlled based on the amount of the electric current so as to change continuously.

The front differential 21 and the rear differential 22 have respectively the same type of electro-magnetic multiplate clutch as that shown in FIG. 2.

Referring to Table 1, control operations carried out by the mode selected in the manual switch 44 will be described below.

TABLE 1

| MANUAL SWITCH | DIFFERENTIAL | CONTROL OPERATION (ELECTRIC CURRENT) |
| --- | --- | --- |
| AUTO (A mode) | front | unlocking condition (If = 0) |
|  | center | auto mode control operation |
|  | rear | auto mode control operation |
| C (C mode) | front | unlocking condition (If = 0) |
|  | center | complete locking condition (Ic = 2.2A) |
|  | rear | auto mode control operation |
| R (R mode) | front | unlocking condition (If = 0) |
|  | center | complete locking condition (Ic = 2.2A) |
|  | rear | complete locking condition (Ir = 4.1A) |
| F (F mode) | front | complete locking condition (Ir = 2.1A) |
|  | center | complete locking condition (Ic = 2.2A) |
|  | rear | complete locking condition (Ir = 4.1A) |

When AUTO (A mode) is selected by the manual switch 44, the front differential 21 is operated to be in unlocking condition, and the center differential 20 and the rear differential 22 are, respectively, operated to be in auto mode control operation which is explained below. When C (C mode) is selected by the manual switch 44, the front differential 21 is operated to be in unlocking condition, the center differential 20 is operated to be in complete locking condition, and the rear differential 22 is controlled to be in auto mode control operation. When R (R mode) is selected by the manual switch 44, the front differential 21 is operated to be in unlocking condition, and the center differential 20 and the rear differential 22 are, respectively, operated to be in complete locking condition. When F (F mode) is selected in the manual switch 44, all of the front differential 21, the center differential 20 and the rear differential 22 are operated to be in complete locking condition. Here, If indicates electric current supplied to the front differential 21, Ic indicates electric current supplied to the center differential 20, and Ir indicates electric current supplied to the rear differential 22. Respective numerals in If, Ic and Ir indicate the amounts of the electric current supplied to the electol-magnetic multiplate clutches provided in respective differentials. When such amounts of the electric current are respectively, supplied the differentials are operated to be in complete locking condition.

The A mode, C mode, R mode and F mode are selected manually by a driver of the vehicle. Since the front differential 21 is operated to be in unlocking condition in A mode, the vehicle has high controllability and normal driving force. Therefore, A mode is suitable for an on-road traveling. On the other hand, since all of the front differential 21, the center differential 20 and the rear differential 22 are operated to be in complete locking condition in F mode, the vehicle has low controllability and large driving force. Therefore, F mode is suitable for off-road traveling. C mode and R mode are located between A mode and F mode and, therefore, are selected by the driver in his favor.

Referring to FIGS. 3 through 9, there is below a description of the flow charts which represent how the differentials are controlled by the control unit 43 according to an embodiment of the present invention. Symbol P indicates each step in the flow charts.

Figure 3:
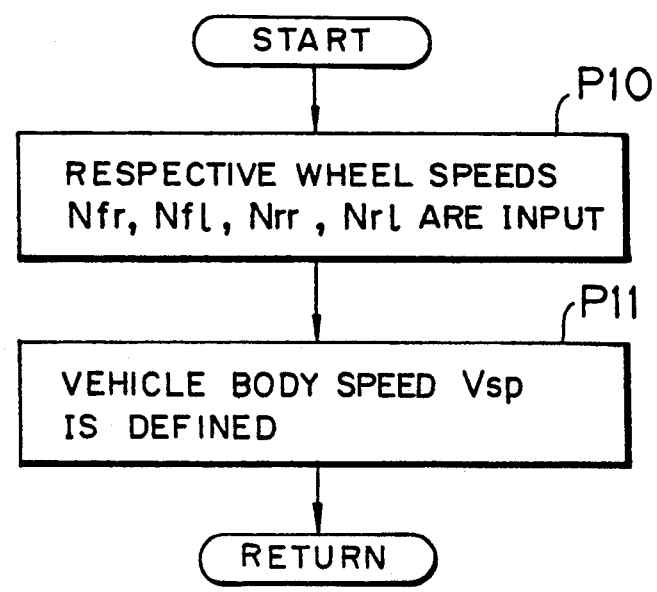
FIG. 3 is a flow chart for defining a vehicle body speed Vsp in auto mode control operation.

FIG. 3 is a flow chart for defining a vehicle body speed Vsp in auto mode control operation employed in A mode and C mode. In FIG. 3, respective wheel speeds Nfr, Nfl, Nrr, Nrl are input to the control unit 43 (P10). Nfr indicates a wheel speed of the right front wheel, Nfl indicates a wheel speed of the left front wheel, Nrr indicates a wheel speed of the right rear wheel, and Nrl indicates a wheel speed of the left rear wheel. Next, the smallest value among the wheel speeds Nfr, Nfl, Nrr, Nrl is defined as a vehicle body speed Vsp (P11).

Figure 4:
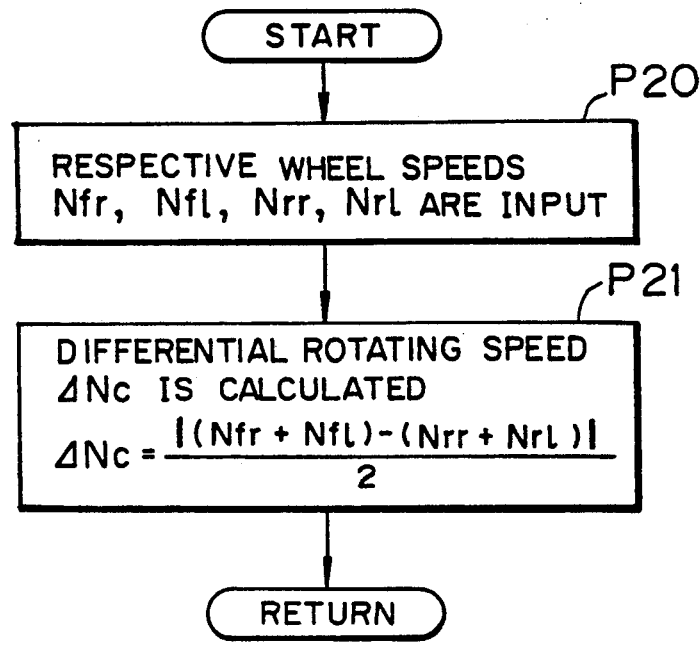
FIG. 4 is a flow chart for obtaining a differential rotating speed in the center differential in auto mode control operation.

FIG. 4 is a flow chart for obtaining a differential rotating speed in the center differential in auto mode control operation. In FIG. 4, respective wheel speeds Nfr, Nfl, Nrr, Nrl are input to the control unit 43 (P20). Next, the differential rotating speed in the center differential $\Delta Nc$ is calculated by the equation (P21).

Figure 5:
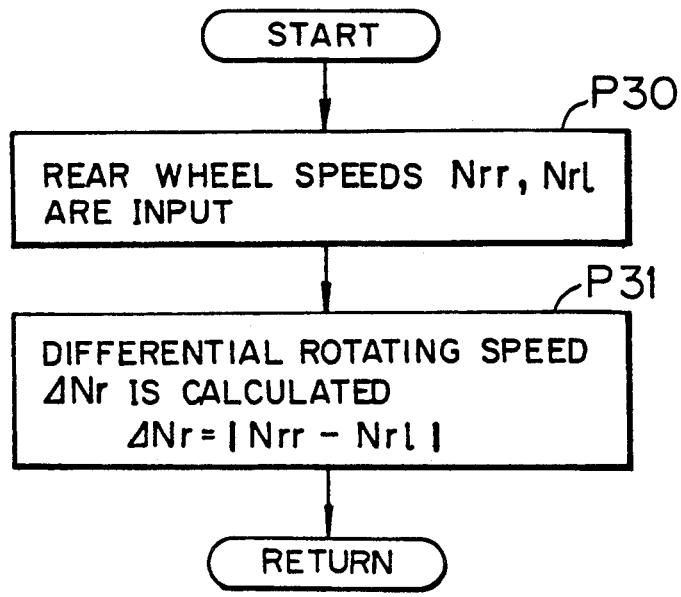
FIG. 5 is a flow chart for obtaining a differential rotating speed in a rear differential in auto mode control operation.

FIG. 5 is a flow chart for obtaining a differential rotating speed in the rear differential in auto mode control operation. In FIG. 5, respective wheel speeds Nrr, Nrl of the rear wheels are input to the control unit 43 (P 30). Next, the differential rotating speed in the rear differential $\Delta Nr$ is calculated by the equation (P 31).

Figure 6:
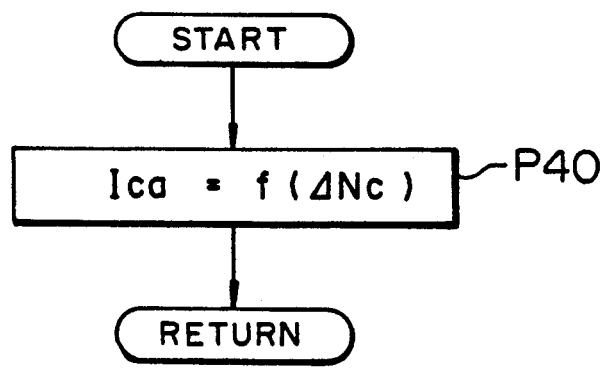
FIG. 6 is a flow chart for determining an amount of the electric current supplied to the center differential in auto mode control operation.

FIG. 6 is a flow chart for determining the amount of the electric current supplied to the center differential in auto mode control operation. As shown in P40 of FIG. 6, center differential electric current Ica is obtained based on a differential rotating speed in the center differential $\Delta Nc$ by using a control map which includes a function of Ica and $\Delta Nc$.

Figure 7:
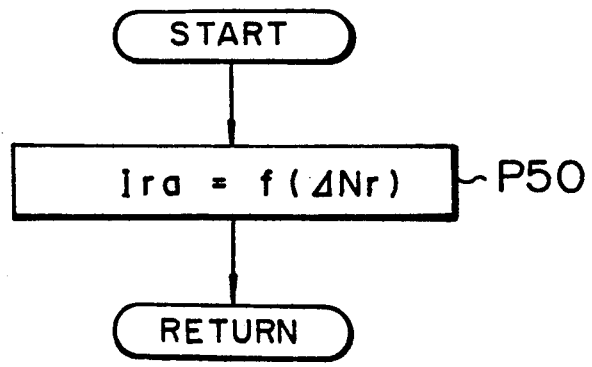
FIG. 7 is a flow chart for determining an amount of the electric current supplied to the rear differential in auto mode control operation.

FIG. 7 is a flow chart for determining the amount of the electric current supplied to the rear differential in the auto mode control operation. As shown in P50 of FIG. 7, rear differential electric current Ira is obtained based on a differential rotating speed in the rear differential $\Delta Nr$ by using a control map which includes a function of Ira and $\Delta Nr$.

MAP1 and MAP2 shown in FIGS. 15 and 16 described below may be employed as the control maps in FIGS. 6 and 7.

Figure 8:
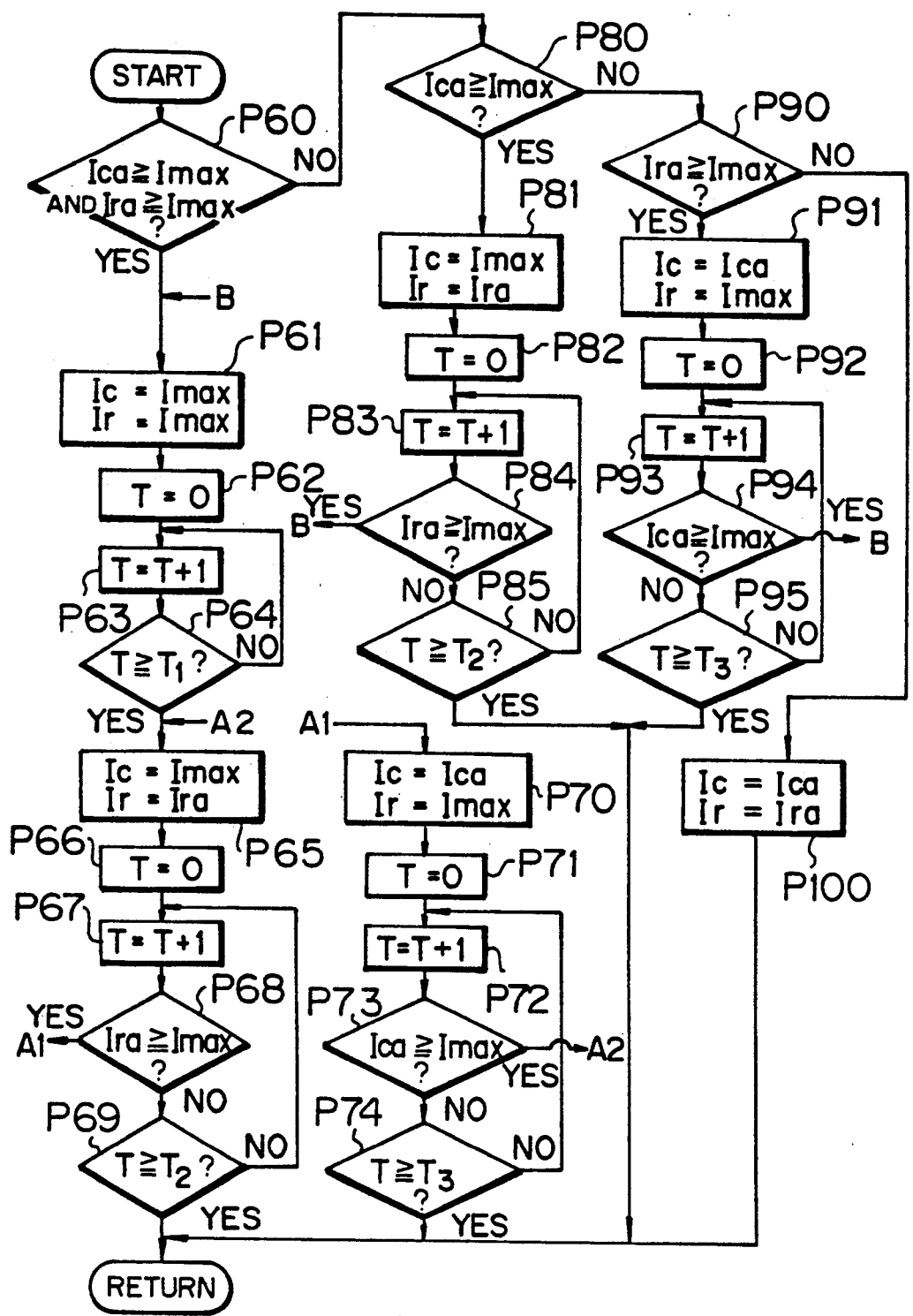
FIG. 8 is a flow chart for operating the center and rear differentials in auto mode control operation.

FIG. 8 is a flow chart for operating the center and rear differentials in auto mode control operation. First, where both the center differential electric current Ica and the rear differential electric current Ira are equal to or greater than respective maximum values Imax, the center differential electric current Ic and the rear differential electric current Ir, both of which are to be output, are respectively set as maximum values Imax (P60, P61). Next, after a predetermined time $T_1$ has passed, the rear differential electric current Ir is set as present Ira which is obtained by the abovementioned control map while maintaining the center differential electric current Ic at the maximum value Imax (P62 through P65). Next, the condition in P65, where the center differential electric current Ic is set as the maximum value Imax and the rear differential electric current Ir is set as present Ira, is maintained for a predetermined time $T_2$ (P66, P67 and P69).

If the rear differential electric current Ira becomes equal to or greater than the maximum value Imax for the predetermined time $T_2$ (P68), the center differential electric current Ic is set as present Ica which is obtained by the abovementioned control map and the rear differential electric current Ir is set as the maximum value Imax (P70). This condition is maintained for a predetermined time $T_3$ (P71, P72 and P74). If the center differential electric current Ica becomes equal to or greater than the maximum value Imax for the Predetermined time $T_3$ (P73), the step proceeds to P65 where the center differential electric current Ic is set as the maximum value Imax and the rear differential electric current Ir is set as present Ira which is obtained by the abovementioned control map.

On the other hand, where one of the center differential electric current Ica and the rear differential electric current Ira is not equal to or greater than each maximum value Imax (P60), it is determined which one of Ica and Ira is not equal to or greater than each maximum value Imax (P80 and P90).

Where the rear differential electric current Ira is not equal to or greater than the maximum value Imax, the center differential electric current Ic is set as the maximum value Imax and the rear differential electric current Ir is set as present Ira which is obtained by the abovementioned control map (P81). Next, the condition in P81, where the center differential electric current Ic is set as the maximum value Imax and the rear differential electric current Ir is set as present Ica, is maintained for a predetermined time $T_2$ (P82, P83 and P85). If the rear differential electric current Ira becomes equal to or greater than the maximum value Imax for the predetermined time $T_2$ (P84), the step proceeds to P61 and then the same operation is carried out where both the center differential electric current Ica and the rear differential electric current Ira are equal to or greater than respective maximum values Imax (P61 through P74).

Where the center differential electric current Ica is not equal to or greater than the maximum value Imax, the rear differential electric current Ir is set as the maximum value Imax and the center differential electric current Ic is set as present Ica which is obtained by the abovementioned control map (P91). Next, the condition in P91 where the rear differential electric current Ir is set as the maximum value Imax and the center differential electric current Ic is set as present Ica is maintained for a predetermined time $T_3$ (P92, P93 and P95). If the center differential electric current Ica becomes equal to or greater than the maximum value Imax for the predetermined time $T_3$ (P94), the step proceeds to P61 and then the same operation is carried out where both the center differential electric current Ica and the rear differential electric current Ira are equal to or greater than respective maximum values Imax (P61 through P74).

Where it is determined that both of the center differential electric current Ica and the rear differential electric current Ira are less than respective maximum values Imax in P80 and P90, the center differential electric current Ic and the rear differential electric current Ir are set, respectively, as present Ica and Ira which are obtained by the abovementioned control maps (P100).

Figure 9:
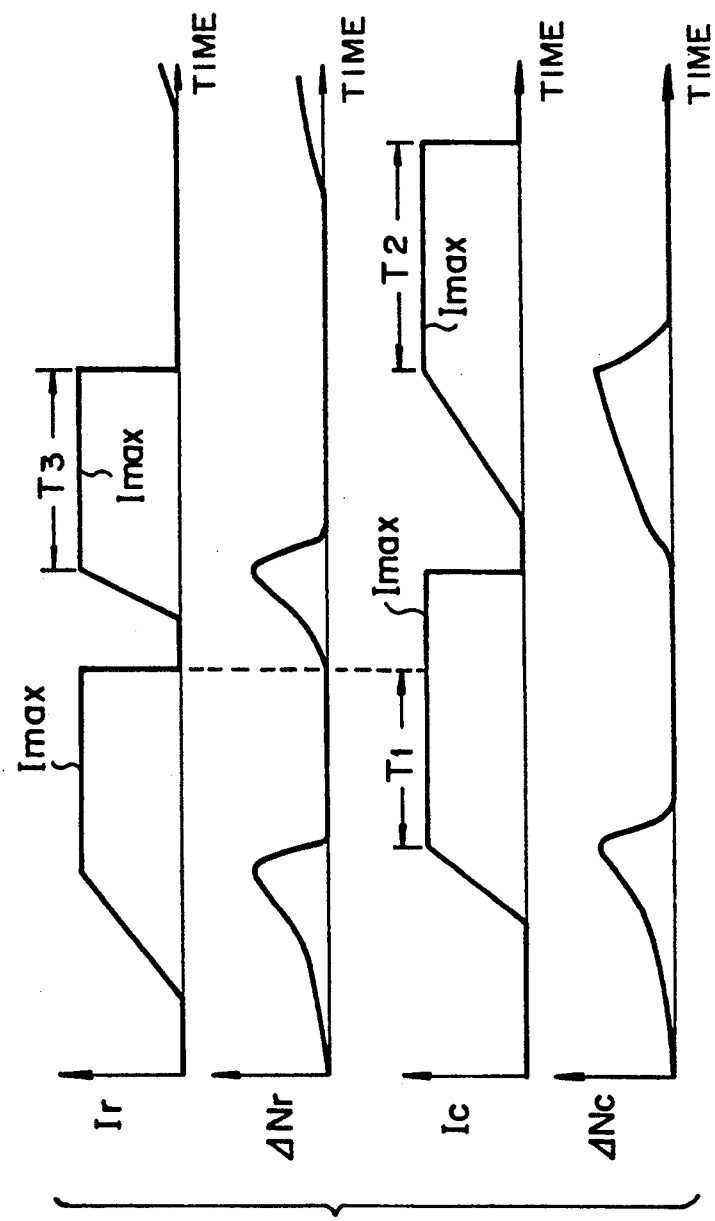
FIG. 9 is a graphical representation showing a typical characteristic in the center differential electric current Ic and the rear differential electric current Ir, and the differential rotating speed in the center differential $\Delta Nc$ and the differential rotating speed in the rear differential $\Delta Nr$ which is obtained by carrying out the control operation shown in FIG. 8.

FIG. 9 is a graphical representation showing a typical characteristic in the center differential electric current Ic and the rear differential electric current Ir, and the differential rotating speed in the center differential $\Delta Nc$ and the differential rotating speed in the rear differential $\Delta Nr$ which is obtained by carrying out the control operation shown in FIG. 8.

As shown in FIG. 8, since the timing when the center differential electric current Ic is stopped from being supplied to the center differential and the timing when the rear differential electric current Ir is stopped from being supplied to the rear differential do not overlap each other, that is, have a time difference each other, the center differential and the rear differential do not get out of locking conditions at the same time as each other. In other words, the center and rear differential get out of locking condition relative to each other, with a time difference. Therefore, the operation shown in FIG. 8 can decrease a torque shock which occurs when the center differential and the rear differential are operated so as to get out locking condition at the same time. Further, since the center differential and the rear differential are operated so as not to get out of a locking condition at the same time, the rapid fluctuation of electric load in the control unit 43 which supplies the operational electric current to the electro-magnetic multi-plate clutches 50 can be prevented from occurring.

Figure 10:
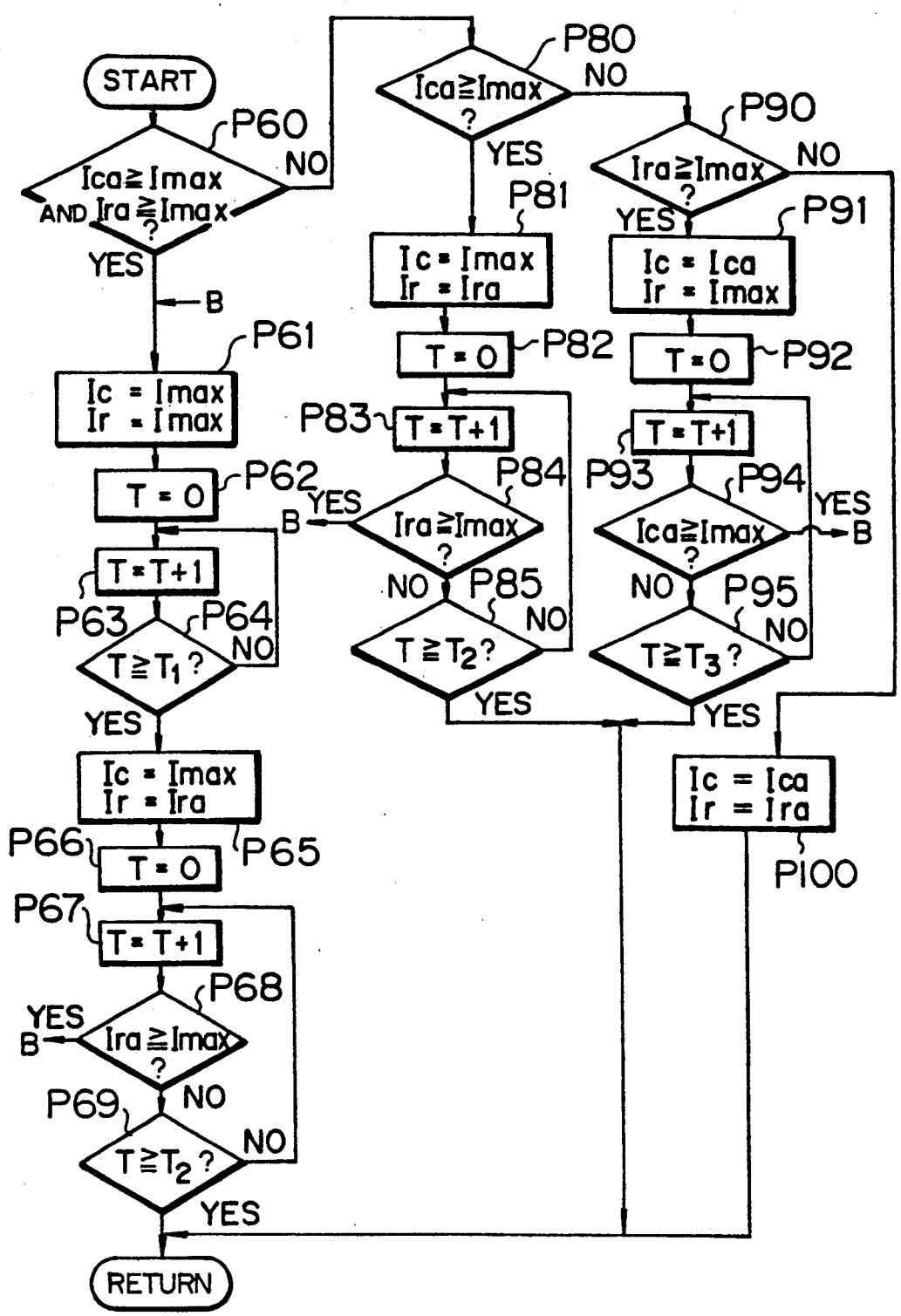
FIG. 10 is a flow chart showing another example of the operation shown in FIG. 8 for operating the center and rear differentials in auto mode control operation.
Figure 11:
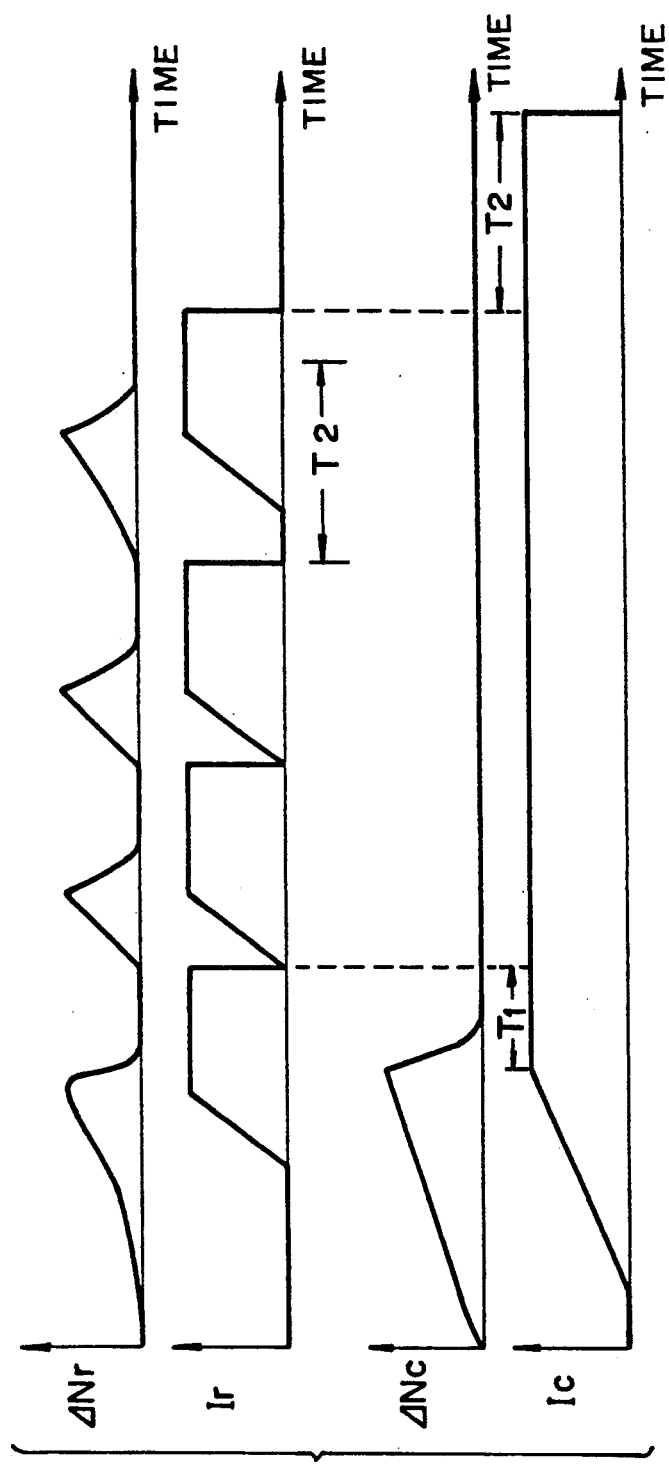
FIG. 11 is a graphical representation showing a typical characteristic which is obtained by carrying out the control operation shown in FIG. 10.

FIG. 10 is a flow chart showing another example of the operation shown in FIG. 8 for operating the center and rear differentials in auto mode control operation. FIG. 11 is a graphical representation showing a typical characteristic which is obtained by carrying out the control operation shown FIG. 10.

In FIG. 10, the steps of P70 through P74 in FIG. 8 are omitted. Other steps of P60 through P69, P80 through P85, P90 through P95, and P100 in FIG. 10 are substantially identical with those in FIG. 8.

Referring to FIG. 10, where both the center differential electric current Ica and the rear differential electric current Ira are equal to or greater than respective maximum values Imax, the center differential electric current Ic and the rear differential electric current Ir, both of which are to be output are, respectively, set as maximum values Imax (P60, P61). This condition where Ic and Ir are respectively set as maximum values Imax is maintained for a predetermined time $T_1$, and then the rear differential electric current Ir is set as present Ira which is obtained by the abovementioned control map while maintaining the center differential electric current Ic at the maximum value Imax (P62 through P65). Next, the condition in P65, where the center differential electric current Ic is set as the maximum value Imax and the rear differential electric current Ir is set as present Ira, is maintained for a predetermined time $T_2$ (P66, P67 and P69). These steps of P60 through P69 are substantially identical with those in FIG. 8.

However, according to the embodiment shown in FIG. 10, if the rear differential electric current Ira becomes equal to or greater than the maximum value Imax while the center differential electric current Ic is set as the maximum value Imax and the rear differential electric current Ir is set as present Ica which is obtained from the abovementioned control map (P68), the center differential electric current Ic and the rear differential electric current Ir, both of which are to be output are, respectively set, again as maximum values Imax and then the condition in P61 is maintained for the predetermined time $T_1$ (P60 through P64). As a result, the center differential electric current Ic is maintained at the maximum value Imax without being set as present Ica which is obtained by the abovementioned control map, and then the center differential electric current Ic is set as present Ica after the present Ira becomes less than the maximum value Imax and then a predetermined time $T_2$ has passed. The operation where one or both of the center differential electric current Ica and the rear differential electric current Ira is not equal to or greater than each maximum value Imax (P80 through P85, P90 through P95, and P100) is identical with that in FIG. 8.

As shown in FIG. 11, in operation the center differential electric current Ic is maintained at the maximum value Imax while the rear differential electric current Ir changes up and down several times. Where the differential rotating speed in the rear differential $\Delta Nr$ becomes zero and then does not reach up to the maximum value Imax within the predetermined time $T_2$, it is set as present Ica based on present differential rotating speed $\Delta Nr$. In an example shown in FIG. 11, the center differential electric current Ic is stopped to be supplied since the differential rotating speed $\Delta Nc$ becomes zero when the predetermined time $T_2$ has passed.

According to the embodiment shown in FIG. 10, the center differential electric current Ic is maintained at the maximum value Imax while the rear differential electric current Ir changes and further respective electric currents Ic and Ir are stopped from being supplied with a predetermined time difference. As a result, the center differential and the rear differential do not get out of the locking conditions at the same time as each other and, therefore a torque shock caused by the operation of getting out of the locking condition can be decreased. Moreover, the rapid fluctuation of electric load in the control unit 43 which supplies the operational electric current to the electro-magnetic multi-plate clutches 50 can be prevented from occurring.

Figure 12:
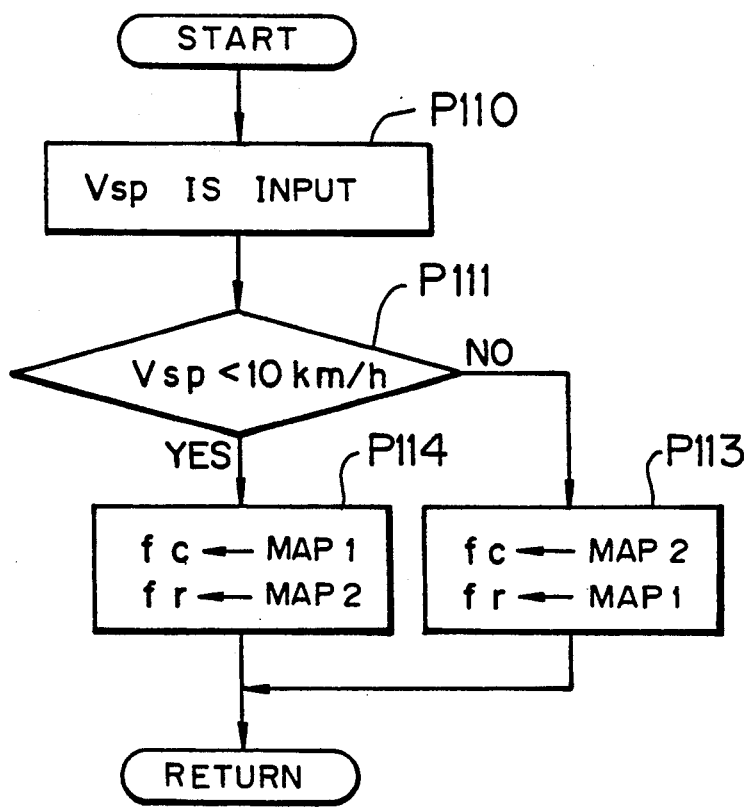
FIG. 12 is a flow chart for switching control maps by which the center differential electric current Ic and the rear differential electric current Ir are determined according to another embodiment of the present invention.
Figure 13:
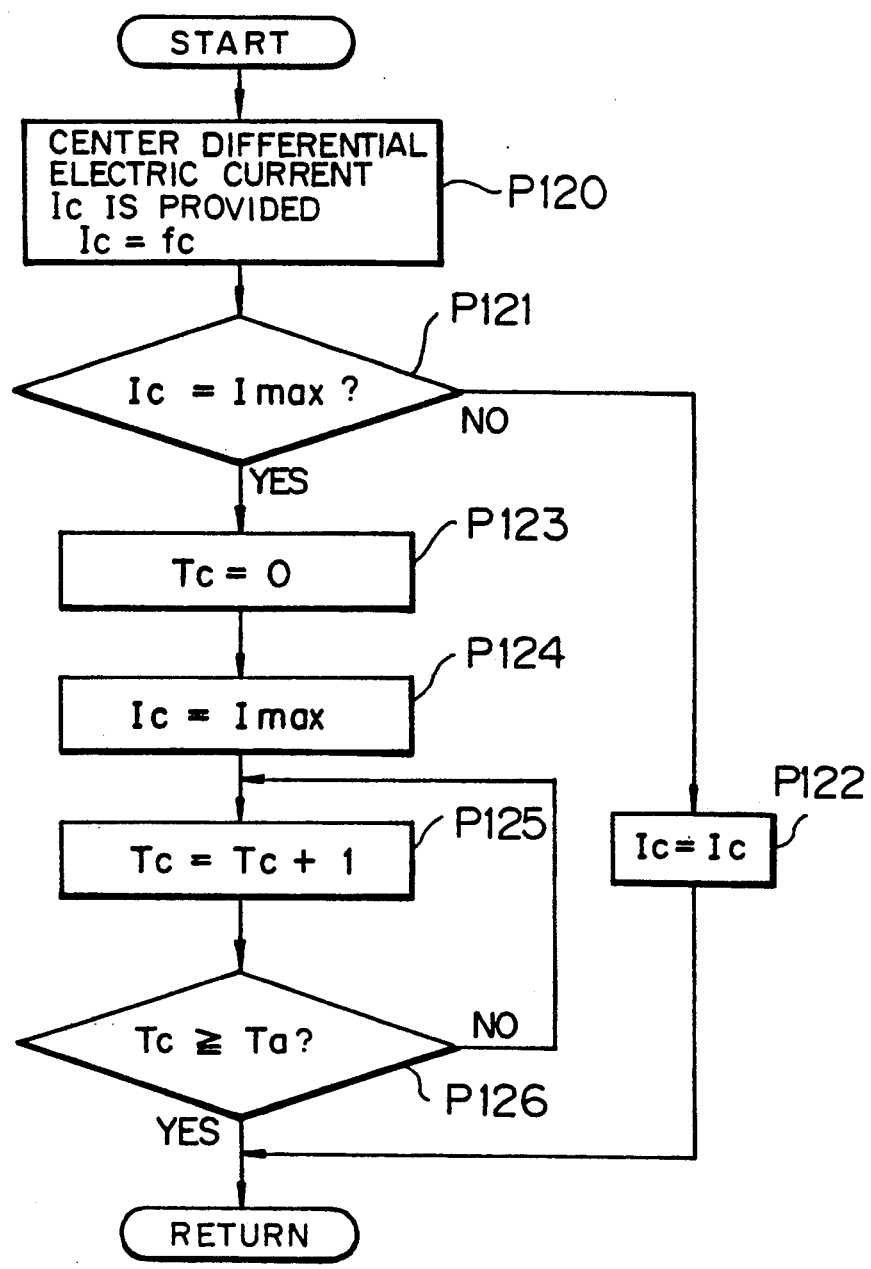
FIGS. 13 and 14 are flow charts for determining the center differential electric current Ic and the rear differential electric current Ir in auto mode control operation according to another embodiment of the present invention.
Figure 14:
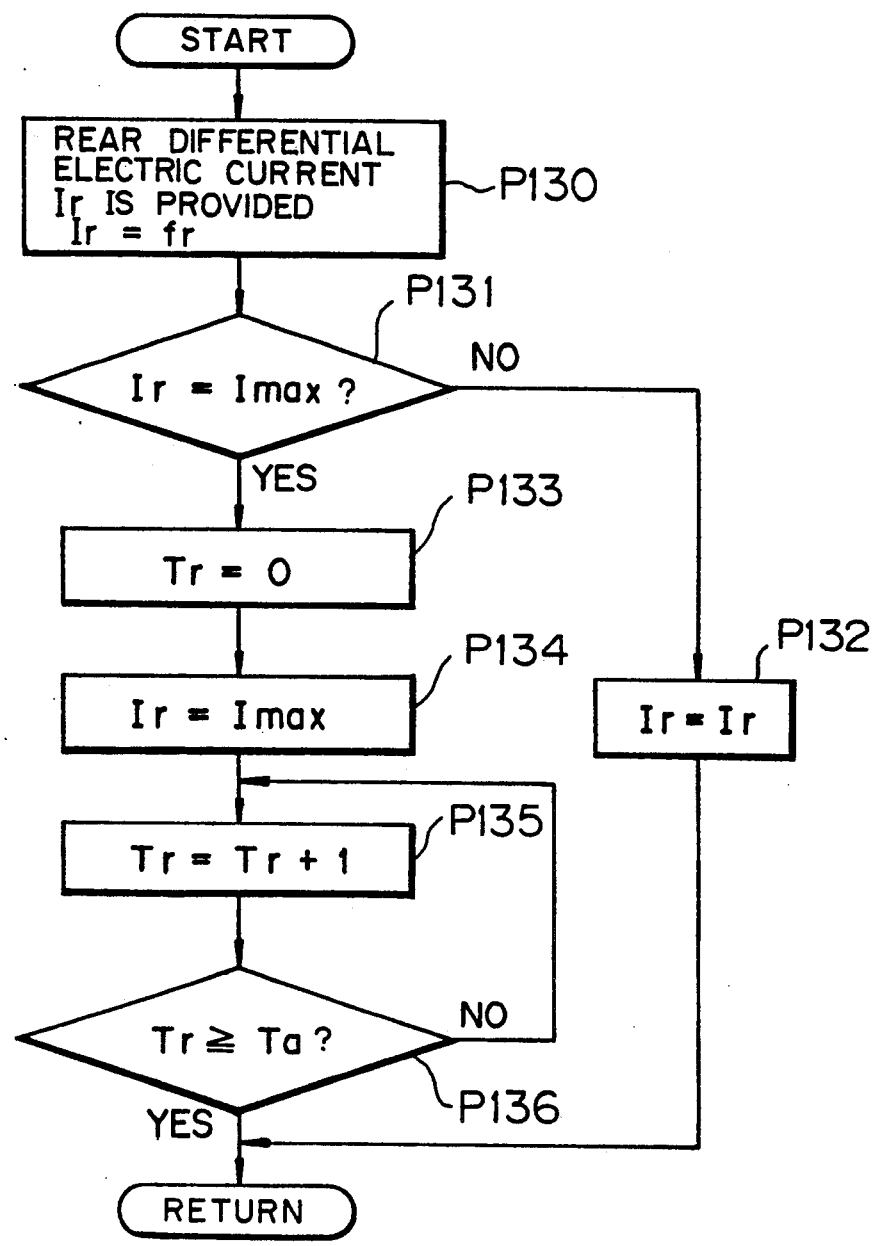
Figure 15:
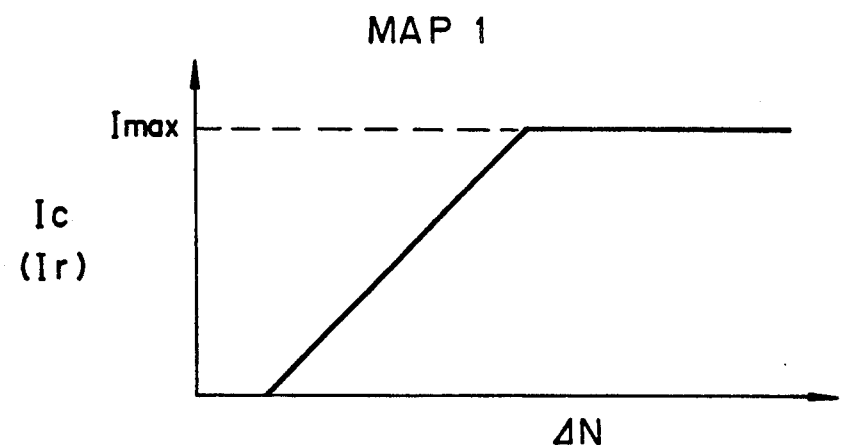
FIGS. 15 and 16 are graphical representations showing two control maps which are employed for obtaining the center differential electric current Ic and the rear differential electric current Ir based on the differential rotating speeds according to another embodiment of the present invention.
Figure 16:
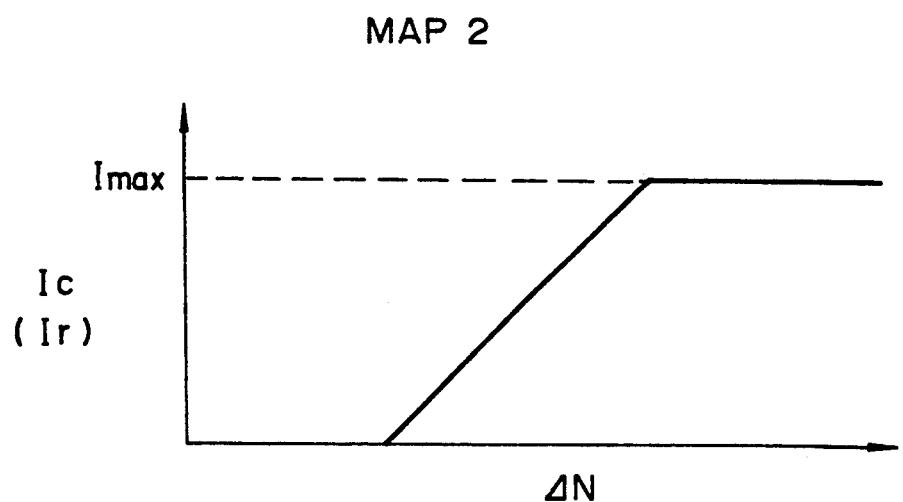

FIGS. 12 through 16 shows another embodiment of the present invention. FIG. 12 is a flow chart for switching control maps by which the center differential electric current Ic and the rear differential electric current Ir are determined. FIGS. 13 and 14 are flow charts for determining the center differential electric current Ic and the rear differential electric current Ir in auto mode control operation. FIGS. 15 and 16 are graphical representations showing two control maps which are employed for obtaining the center differential electric current Ic and the rear differential electric current Ir based on the differential rotating speeds.

Referring to FIG. 13, the center differential electric current Ic is provided as If based on the differential rotating speed $\Delta Nc$ by employing one of the control maps shown in FIGS. 15 and 16 (P120).

In the respective control maps, the electric current Ic (Ir) is provided as a function of a differential rotating speed $\Delta N$. For example, as shown in FIG. 15, the electric current Ic (Ir) increases in proportion to an increase in the differential rotating speed $\Delta N$ and is set as a maximum value Imax where the differential rotating speed $\Delta N$ becomes greater than a predetermined value. A first control map indicated as MAP1 shown in FIG. 15 and a second control map indicated as MAP2 shown in FIG. 16 are different from each other in a certain region. As a result, different electric current Ic or Ir can be provided under the same differential rotating speed $\Delta N$ by using MAP1 and MAP2. Where MAP1 is employed, the electric current Ic (Ir) reaches the maximum value Imax in a lower differential rotating speed $\Delta N$ than where MAP2 is employed. MAP1 and MAP2 are used commonly in obtaining the electric current Ic and Ir. Another control map may be employed which includes a control map for the center differential electric current Ic and a control map for the rear differential electric current Ic independently. Another control map should include same characteristic as explained in FIGS. 15 and 16. Instead of the differential rotating speed $\Delta N$, a function of a throttle valve opening may be employed.

FIG. 12 shows how to switch the control maps MAP1 and MAP2. First, the vehicle body speed Vsp is input and then it is determined whether or not the vehicle body speed Vsp is less than 10 km/h (P110 and P111). Where the vehicle body speed Vsp is less than 10 km/h, MAP1 shown in FIG. 15 is employed for providing the center differential electric current Ic and MAP2 shown in FIG. 16 is employed for providing the rear differential electric current Ir (P112). On the other hand, where the vehicle body speed Vsp is equal to or greater than 10 km/h, MAP2 shown in FIG. 16 is employed for providing the center differential electric current Ic and MAP1 shown in FIG. 15 is employed for providing the rear differential electric current Ir (P113).

As a result, since MAP1 has the characteristic where the electric current Ic reaches the maximum value Imax in an early stage in comparison with MAP2, when the vehicle body speed Vsp is less than 10 km/h, that is, the vehicle is starting or traveling at a low speed, the center differential electric current Ic increases in an early stage in comparison with the rear differential electric current Ir. On the other hand, where the vehicle body speed Vsp is equal to or greater than 10 km/h, the rear differential electric current Ir increases in an early stage in comparison with the center differential electric current Ic.

Referring to FIG. 13, the center differential electric current Ic is provided as fc obtained based on the differential rotating speed $\Delta Nc$ by using one of the above-mentioned MAP1 and MAP2 (P120). Next, it is determined whether or not the center differential electric current Ic is a maximum value Imax (P121). Where the center differential electric current Ic is not the maximum value Imax, that is, Ic is less than Imax, Ic is set as Ic (P122). At this time, the center differential 20 is in half locking condition or unlocking condition. Where the center differential electric current Ic is the maximum value Imax, a timer is set at an initial value P123), and the center differential electric current Ic is set as Imax (P124). At this time, the center differential 20 is in complete locking condition. Next, the timer is counted up (P125), and then it is determined whether or not a predetermined time period Ta has passed (P126). Thus, since complete locking condition in the center differential 20 is maintained for the predetermined time period Ta, hunting caused by rapid changes of the differential rotating speed in the center differential $\Delta Nc$ and the like can be prevented.

As shown in FIG. 14, how to provide the rear differential electric current Ir is basically identical with the manner of the center differential electric current Ic in FIG. 13. That is, the rear differential electric current Ir is provided as fc obtained based on the differential rotating speed $\Delta Nr$ by using one of MAP1 shown in FIG. 15 and MAP2 shown in FIG. 16 (P130). Next, it is determined whether or not the rear differential electric current Ir is a maximum value Imax (P131). Where the rear differential electric current Ir is not the maximum value Imax, that is, Ic is less than Imax, Ir is set as Ir (P132). At this time, the rear differential 22 is in half locking condition or unlocking condition. Where the rear differential electric current Ir is the maximum value Imax, a timer is set at an initial value (P133), and the rear differential electric current Ir is set as Imax (P134). At this time, the rear differential 22 is in complete locking condition Next, the timer is counted up (P135), and then it is determined whether or not a predetermined time period Ta has been passed (P136). Thus, since complete locking condition in the rear differential 22 is maintained for the predetermined time period Ta, the hunting caused by rapid changes of the differential rotating speed in the center differential $\Delta Nc$ and the like can be prevented.

According to the abovementioned embodiment of the present invention, the two kinds of control maps MAP1 and MAP2 are employed where the electric current reaches the maximum value Imax in an early stage in MAP1 in comparison with that in MAP2 Furthermore, by switching those control maps at the predetermined vehicle body speed such as 10 km/h, the center differential electric current Ic increases in an early stage in comparison with the rear differential electric current Ir while the vehicle is starting or traveling at a low speed which is less than 10 km/h and, on the other hand, the rear differential electric current Ir increases in an early stage in comparison with the center differential electric current Ic while the vehicle is traveling at an intermediate or high speed which is equal to or greater than 10 km/h. As a result, while the vehicle is starting or traveling at a low speed, the rear differential 22 is operated to be in locking condition in a late stage and is released from locking condition in an early stage in comparison with the center differential 20. On the other hand, the center differential 20 is operated to be in locking condition in an early stage and is released from locking condition in a late stage in comparison with the rear differential 22. While the vehicle is traveling at an intermediate or high speed, the center differential 20 is operated to be in locking condition in a late stage and is released from locking condition in an early stage in comparison with the rear differential 22. On the other hand, the rear differential 22 is operated to be in locking condition in an early stage and is released from locking condition in a late stage in comparison with the center differential 20. Therefore, according to this embodiment, since the respective differentials can be prevented from being operated to be in locking condition and being released from locking condition at the same time, the torque shock caused by the locking operation can be decreased and the rapid fluctuation of electric load in the control unit 43 which supplies the operational electric current to the electro-magnetic multi-plate clutches 50 can be prevented from occurring. Moreover, since the differential operation in the rear differential 22 is being maintained for a relatively long time while the vehicle is starting or traveling at a low speed, the slip occurring by the starting operation can be prevented advantageously. Since the locking operation in the center differential 20 which has influence on controllability of the vehicle is delayed, good controllability can be obtained.

Figure 17:
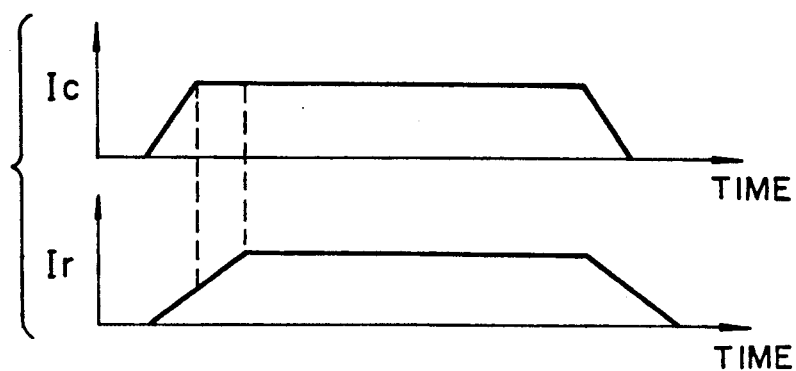
FIG. 17 is a graphical representation showing still another embodiment of the present invention.

FIG. 17 is a graphical representation showing still another embodiment of the present invention. According to this embodiment, without employing the above-mentioned control maps, a rate of change $dIc/dt$ in the center differential electric current Ic and a rate of change $dIr/dt$ in the rear differential electric current Ir are provided. As shown in FIG. 17, the center differential electric current rate of change $dIc/dt$ increases rapidly and the rear differential electric current rate of change $dIr/dt$ increases slowly. This characteristic is obtained by providing the rate of changes $dIc/dt$ and $dIr/dt$ so that the rate of change $dIc/dt$ is greater than the rate of change $dIr/dt$.

As a result, since the timing of the center differential electric current Ic reaching the maximum value Imax is different from the timing of the rear differential electric current Ir reaching the maximum value Imax, both the center differential 20 and the rear differential 22 can be prevented from operating so that they are in complete locking condition at the same time and the torque shock occurring by the complete locking operation in the differentials 20, 22 at the same time can be decreased. Further, since the rates of change $dIc/dt$ and $dIr/dt$ are different from each other, the rapid fluctuation of electric load in the control unit 43 which supplies the operational electric current to the electro-magnetic multi-plate clutches 50 can be prevented from occurring.

According to the present invention, there is provided a control system for a four-wheel drive vehicle which can decrease the torque shock by operating the respective differentials not so as to be in locking condition at the same time.

According to the present invention, there is also provided a control system for a four-wheel drive vehicle which can obtain the desired differential restricting operation and decrease the differential operation in the differential restricting device by one of the differential restricting devices being maintained in locking condition for a relatively long time.

According to the present invention, there is also provided a control system for a four-wheel drive vehicle comprising differential restricting devices activated electrically which can prevent the rapid fluctuation of electric load occurring in the devices by operating the devices differently in timing.

According to the present invention, there is further provided a control system for a four-wheel drive vehicle which prevents the slips advantageously by restricting the differential in the center differential in an early stage with the differential operation in the rear differential being carried out when the vehicle is traveling at a low speed, and, on the other hand, which obtains good controllability by restricting the differential in the rear differential which has little influence on the controllability of the vehicle in an early stage. The differential operation in the center differential which distributes driving torque to the front shaft and the rear shaft is carried out when the vehicle is traveling at an intermediate or high speed.

The present invention has been described with reference to the preferred embodiments thereof which are intended to be illustrative rather than limiting. Various changes and modifications may be made without departing from the spirit and scope of the invention as defined in the following claims.

What is claimed is:

1. A control system for a four-wheel drive vehicle including a center differential provided between a front shaft, which transmits engine power to a front differential, and a rear shaft, which transmits engine power to a rear differential, said front differential and said rear differential each being provided between a right wheel and a left wheel, said control system comprising:

first means provided in the center differential for restricting a differential between the front shaft and the rear shaft;

second means provided in at least one of the front differential and the rear differential for restricting a differential between at least one right wheel and at least one left wheel; and controlling means for controlling the restricting operations carried out by the first means and the second means;

said controlling means including operational timing controlling means for controlling operational timings in the first means and the second means so that a timing when the first means maintains the center differential in a locking condition is different from a timing when the second means maintains the at least one of the front differential and the rear differential in a locking condition.

2. A control system in accordance with claim 1 in which said operational timing controlling means controls operational timings in the first means and the second means so that the timing when the first means releases the center differential from the locking condition is different from the timing when the second means releases the at least one of the front differential and the rear differential from the locking condition.

3. A control system in accordance with claim 1 in which said operational timing controlling means controls operational timings in the first means and the second means so that the timing when the first means operates the center differential to be in the locking condition is different from the timing when the second means operates the at least one of the front differential and the rear differential to be in locking condition.

4. A control system in accordance with claim 1 in which said operational timing controlling means controls operational timings in the first means and the second means so that, when one of the first and second means releases one of the center and the at least one of the front and rear differentials after the first and second means maintain the center and the at least one of the front and rear differentials in the locking condition, the other of the first and second means releases another of the center and the at least one of the front and rear differentials after the one of the first and second means has released one of the center and the at least one of the front and rear differentials for a predetermined time.

5. A control system in accordance with claim 1 in which said operational timing controlling means controls operational timings in the first means and the second means so that the center differential is operated to be in the locking condition in an early stage in comparison with the at least one of the front differential and the rear differential while the vehicle is traveling at a speed which is less than a predetermined value, and the at least one of the front differential and the rear differential is operated to be in the locking condition in an early stage in comparison with the center differential while the vehicle is traveling at a speed which is equal to or greater than the predetermined value.

6. A control system in accordance with claim 1 in which at least one of said first means and said second means includes a friction engaging device for restricting the differential in at least one of the center differential and the at least one of the front differential and the rear differential based on electric signals supplied from the controlling means.

7. A control system for a four-wheel drive vehicle including a center differential provided between a front shaft, which transmits engine power to a front differential, and a rear shaft, which transmits engine power to a rear differential, said front differential and said rear differential each being provided between a right wheel and a left wheel, said control system comprising:

first means provided in the center differential for restricting a differential between the front shaft and the rear shaft;

second means provided in at least one of the front differential and the rear differential for restricting a differential between at least one right wheel and at least one left wheel; and controlling means for controlling the restricting operations carried out by the first means and the second means;

said first and second means including friction engaging devices, each of which respectively restricts the differentials in one of the center differential and the at least one of the front differential and the rear differential by applying a proportional friction force to one of the center differential and the at least one of the front differential and the rear differential, said controlling means including change rate controlling means for controlling rates of change in the friction forces applied to the center and at least one of the front and rear differentials by the friction engaging devices so that the rate of change in the friction force applied to the center differential is different from the rate of change in the friction force applied to the at least one of the front differential and the rear differential.

8. A control system in accordance with claim 7 in which said friction engaging devices are activated by electric signals.

9. A control system in accordance with claim 1 in which said operational timing controlling means controls operational timings in the first and second means so that the period during which the first means maintains the center differential in the locking condition is longer than the period during which the second means maintains the one of the front differential and the rear differential in the locking condition.

10. A control system in accordance with claim 7 in which said change rate controlling means controls the rate of changes in the friction forces applied to the center differential and the one of the front differential and the rear differential so that the rate of change in the friction force applied to the center differential is higher than the rate of change in the friction force applied to the one of the front differential and the rear differential.

11. A control system for a four-wheel vehicle including a first differential provided between a front shaft and a rear shaft and a second differential provided between a right wheel and a left wheel, said control system comprising:

first means provided in the first differential for restricting a differential between the front shaft and rear shaft;

second means provided in the second differential for restricting a differential between the right wheel and the left wheel; and controlling means for controlling the restricting operation carried out by the first means and the second means;

said controlling means including means for controlling operational timings in the first means and the second means so that the timing when the first means maintains the first differential in a locking condition is different from the timing when the second means maintains the second differential in a locking condition, and the timing when the first means releases the first differential from the locking condition is different from the timing when the second means releases the second differential from the locking condition.

12. A control system for a four-wheel vehicle including a first differential provided between a front shaft and a rear shaft and a second differential provided between a right wheel and a left wheel, said control system comprising:
- first means provided in the first differential for restricting a differential between the front shaft and the rear shaft;
- second means provided in the second differential for restricting a differential between the right wheel and the left wheel; and
- controlling means for controlling the restricting operation carried out by the first means and the second means;
- said controlling means including means for controlling operational timings in the first means and the second means so that the timing when the first means maintains the first differential in a locking condition is different from the timing when the second means maintains the second differential in a locking condition, and the timing when the first means operates the first differential to be in the locking condition is different from the timing when the second means operates the second differential to be in the locking condition.

13. A control system for a four-wheel vehicle including a first differential provided between a front shaft and a rear shaft and a second differential provided between a right wheel and a left wheel, said control system comprising:
- first means provided in the first differential for restricting a differential between the front shaft and the rear shaft;
- second means provided in the second differential for restricting a differential between the right wheel and the left wheel; and
- controlling means for controlling the restricting operation carried out by the first means and the second means;
- said controlling means includes means for controlling operational timings in the first means and the second means so that the timing when the first means maintains the first differential in a locking condition is different from the timing when the second means maintains the second differential in a locking condition, and, when one of the first and second means releases one of the first and the second differentials after the first and second means maintain the first and second differentials in the locking condition, the other of the first and second means releases the other of the first and second differentials after the one of the first and second means has released one of the first and second differentials for a predetermined time.

14. A control system for a four-wheel vehicle including a first differential provided between a front shaft and a rear shaft and a second differential provided between a right wheel and a left wheel, said control system comprising:
- first means provided in the first differential for restricting a differential between the front shaft and the rear shaft;
- second means provided in the second differential for restricting a differential between the right wheel and the left wheel; and
- means for controlling the restricting operation carried out by the first means and the second means;
- said controlling means including means for controlling operational timings in the first means and the second means so that the timing when the first means maintains the first differential in a locking condition is different from the timing when the second means maintains the second differential in a locking condition, wherein the first differential is operated to be in the locking condition in an early stage in comparison with the second differential while the vehicle is traveling at a speed which is less than a predetermined value and the second differential is operated to be in locking condition in an early stage in comparison with the first differential while the vehicle is traveling at a speed which is at least equal to the predetermined value.

* * * * *